(12) United States Patent
Krishnan et al.

(10) Patent No.: US 8,782,762 B2
(45) Date of Patent: Jul. 15, 2014

(54) BUILDING DATA SECURITY IN A NETWORKED COMPUTING ENVIRONMENT

(75) Inventors: Narayanan Krishnan, Chennai (IN); Kishorekumar Neelamegam, Chennai (IN); Vibhaw P. Rajan, Chennai (IN); Ram Viswanathan, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 13/211,412

(22) Filed: Aug. 17, 2011

(65) Prior Publication Data

US 2013/0047230 A1    Feb. 21, 2013

(51) Int. Cl.
  *G06F 7/04* (2006.01)
  *H04L 9/32* (2006.01)
  *G06F 12/14* (2006.01)

(52) U.S. Cl.
  USPC .................. 726/7; 726/30; 713/168; 713/193

(58) Field of Classification Search
  USPC ............ 726/2–10, 26–30; 713/150, 164–167, 713/189, 193; 707/999.001, 999.009
  See application file for complete search history.

(56) References Cited

U.S. PATENT DOCUMENTS

| | | | | |
|---|---|---|---|---|
| 6,178,505 | B1 * | 1/2001 | Schneider et al. | 713/168 |
| 6,289,462 | B1 * | 9/2001 | McNabb et al. | 726/21 |
| 6,473,825 | B1 * | 10/2002 | Worley et al. | 710/306 |
| 7,739,348 | B2 | 6/2010 | Becker | |
| 2004/0034769 | A1 * | 2/2004 | Bacha et al. | 713/153 |
| 2004/0187020 | A1 * | 9/2004 | Leerssen et al. | 713/200 |
| 2006/0059567 | A1 * | 3/2006 | Bird et al. | 726/27 |
| 2006/0248599 | A1 * | 11/2006 | Sack et al. | 726/27 |
| 2007/0130130 | A1 | 6/2007 | Chan et al. | |
| 2008/0028436 | A1 * | 1/2008 | Hannel et al. | 726/1 |
| 2008/0082540 | A1 | 4/2008 | Weissman et al. | |
| 2008/0086479 | A1 | 4/2008 | Fry et al. | |
| 2008/0115223 | A1 * | 5/2008 | Morris et al. | 726/27 |
| 2008/0163382 | A1 * | 7/2008 | Blue et al. | 726/28 |
| 2009/0276477 | A1 | 11/2009 | Thuringer et al. | |
| 2010/0169639 | A1 * | 7/2010 | Jeffries et al. | 713/153 |
| 2010/0217850 | A1 | 8/2010 | Ferris | |
| 2010/0333116 | A1 | 12/2010 | Prahlad et al. | |
| 2011/0055897 | A1 * | 3/2011 | Arasaratnam | 726/3 |
| 2011/0154443 | A1 * | 6/2011 | Thakur et al. | 726/3 |

OTHER PUBLICATIONS

Maitland, J., "Keeping Control Isn't Easy", Chapter 4: Cloud-Based Infrastructure, SearchCloudComputing.com, 13 pages.
Mell et al., "The NIST Definition of Cloud Computing", National Institute of Standards and Technology, Information Technology Laboratory, Version 15, Oct. 7, 2009, 2 pages.

* cited by examiner

*Primary Examiner* — Darren B Schwartz
(74) *Attorney, Agent, or Firm* — John Pivnichny; Keohane & D'Alessandro PLLC

(57) ABSTRACT

In general, embodiments of the present invention provide an approach for providing a multi-tenant/customer partition group separator and securer in a shared cloud infrastructure (e.g., as an extension to DB2®, Label-Based Access Control (LBAC), and/or an independent tool). Among other things, embodiments of the present invention provide cloud administrators with an easy to use customizable, configurable security constraint builder/tool with a built-in multi-tenant/customer enabled security model. Moreover, embodiments of the present invention enable cloud administrators to set up, configure, and manage tenants/customers and their private shards with their own security constraints. The output of this tool greatly eases the time to create an invisible (e.g., software) wall of separation for multiple tenants/customers in a shared cloud infrastructure.

22 Claims, 12 Drawing Sheets

| NAME | EMPID | CITY |
|---|---|---|
| A ($M_1N_1 1°$) | 001 ($M_1N_1 1°$) | MAS ($M_1N_1 3°$) |
| B ($M_1N_2 1°$) | 002 ($M_1N_1 2°$) | LUK ($M_1N_2 3°$) |
| C ($M_1N_3 1°$) | 003 ($M_1N_1 3°$) | CHN ($M_1N_3 3°$) |
| D ($M_2N_1 1°$) | 004 ($M_2N_1 3°$) | PUN ($M_3N_1 1°$) |
| E ($M_2N_1 1°$) | 005 ($M_2N_1 3°$) | KLL ($M_3N_1 1°$) |
| F ($M_2N_1 1°$) | 006 ($M_2N_1 3°$) | SBC ($M_3N_1 1°$) |
| G ($M_3N_1 2°$) | 007 ($M_3N_1 2°$) | NDLS ($M_3N_1 3°$) |
| H ($M_3N_1 2°$) | 008 ($M_3N_1 2°$) | REP ($M_3N_1 3°$) |
| I ($M_3N_1 2°$) | 009 ($M_3N_1 2°$) | MYS ($M_3N_1 3°$) |

FIG. 8

BUILDING DATA SECURITY IN A NETWORKED COMPUTING ENVIRONMENT

TECHNICAL FIELD

In general, embodiments of the present invention relate to data security. Specifically, the present invention relates to the building of data security in a networked computing environment (e.g., shared cloud computing infrastructure).

BACKGROUND OF THE INVENTION

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, storage devices, among others.

In traditional shared cloud data infrastructures, tools for separation of multi-tenant/customer data are at a single tenant/customer focus level where access controls for table rows are on a user basis. Moreover, the control of associated column(s) to hide or show data is determined on a per policy basis. As such, there is a gap in identifying multi-tenant/customer needs, capabilities to define them, and to insert different constraints into various private shard/partition groups in an automated fashion. Still yet, it is difficult to set up a manual separation of multi-tenant/customer data in a shared infrastructure with per tenant/customer or partition group specific security constraint. A highly skilled Database Administrator (DBA) will be needed to set up such separation across various cloud infrastructures repetitively. Such an approach can be both costly and inefficient.

SUMMARY OF THE INVENTION

In general, embodiments of the present invention provide an approach for providing a multi-tenant/customer partition group separator and securer in a shared cloud infrastructure (e.g., as an extension to DB2®, Label-Based Access Control (LBAC), and/or an independent tool). Among other things, embodiments of the present invention provide cloud administrators with an easy to use customizable, configurable security constraint builder/tool with a built-in multi-tenant/customer enabled security model. Moreover, embodiments of the present invention enable cloud administrators to set up, configure, and manage tenants/customers and their private shards with their own security constraints. The output of this tool greatly eases the time to create an invisible (e.g., software) wall of separation for multiple tenants/customers in a shared cloud infrastructure.

A first aspect of the present invention provides a computer-implemented method for building data security in a networked computing environment, comprising: partitioning a shared data source of the networked computing environment into a set of private partitions pertaining to a set of customers; receiving a connection request for the shared data source from a customer of the set of customers, the connection request having a cryptographic key associated with the customer; creating a trusted compartment for the customer responsive to an authentication of the cryptographic key; receiving a data request from the customer and validating the data request using a sensitivity index; processing the data request using a buffer pool frame and the private partition corresponding to the customer; and creating an entry in a log corresponding to the customer pursuant to the processing.

A second aspect of the present invention provides a system for building data security in a networked computing environment, comprising: a memory medium comprising instructions; a bus coupled to the memory medium; and a processor coupled to the bus that when executing the instructions causes the system to: partition a shared data source of the networked computing environment into a set of private partitions pertaining to a set of customers; receive a connection request for the shared data source from a customer of the set of customers, the connection request having a cryptographic key associated with the customer; create a trusted compartment for the customer responsive to an authentication of the cryptographic key; receive a data request from the customer and validating the data request using a sensitivity index; process the data request using a buffer pool frame and the private partition corresponding to the customer; and create an entry in a log corresponding to the customer pursuant to the processing.

A third aspect of the present invention provides a computer program product for building data security in a networked computing environment, the computer program product comprising a computer readable storage media, and program instructions stored on the computer readable storage media, to: partition a shared data source of the networked computing environment into a set of private partitions pertaining to a set of customers; receive a connection request for the shared data source from a customer of the set of customers, the connection request having a cryptographic key associated with the customer; create a trusted compartment for the customer responsive to an authentication of the cryptographic key; receive a data request from the customer and validating the data request using a sensitivity index; process the data request using a buffer pool frame and the private partition corresponding to the customer; and create an entry in a log corresponding to the customer pursuant to the processing.

A fourth aspect of the present invention provides a method for deploying a system for building data security in a networked computing environment: providing a computer infrastructure being operable to: partition a shared data source of the networked computing environment into a set of private partitions pertaining to a set of customers; receive a connection request for the shared data source from a customer of the set of customers, the connection request having a cryptographic key associated with the customer; create a trusted compartment for the customer responsive to an authentication of the cryptographic key; receive a data request from the customer and validating the data request using a sensitivity index; process the data request using a buffer pool frame and the private partition corresponding to the customer; and create an entry in a log corresponding to the customer pursuant to the processing.

BRIEF DESCRIPTION OF THE DRAWINGS

These and other features of this invention will be more readily understood from the following detailed description of the various aspects of the invention taken in conjunction with the accompanying drawings in which:

FIG. 8 depicts an illustrative table according to an embodiment of the present invention.

Figure 1:
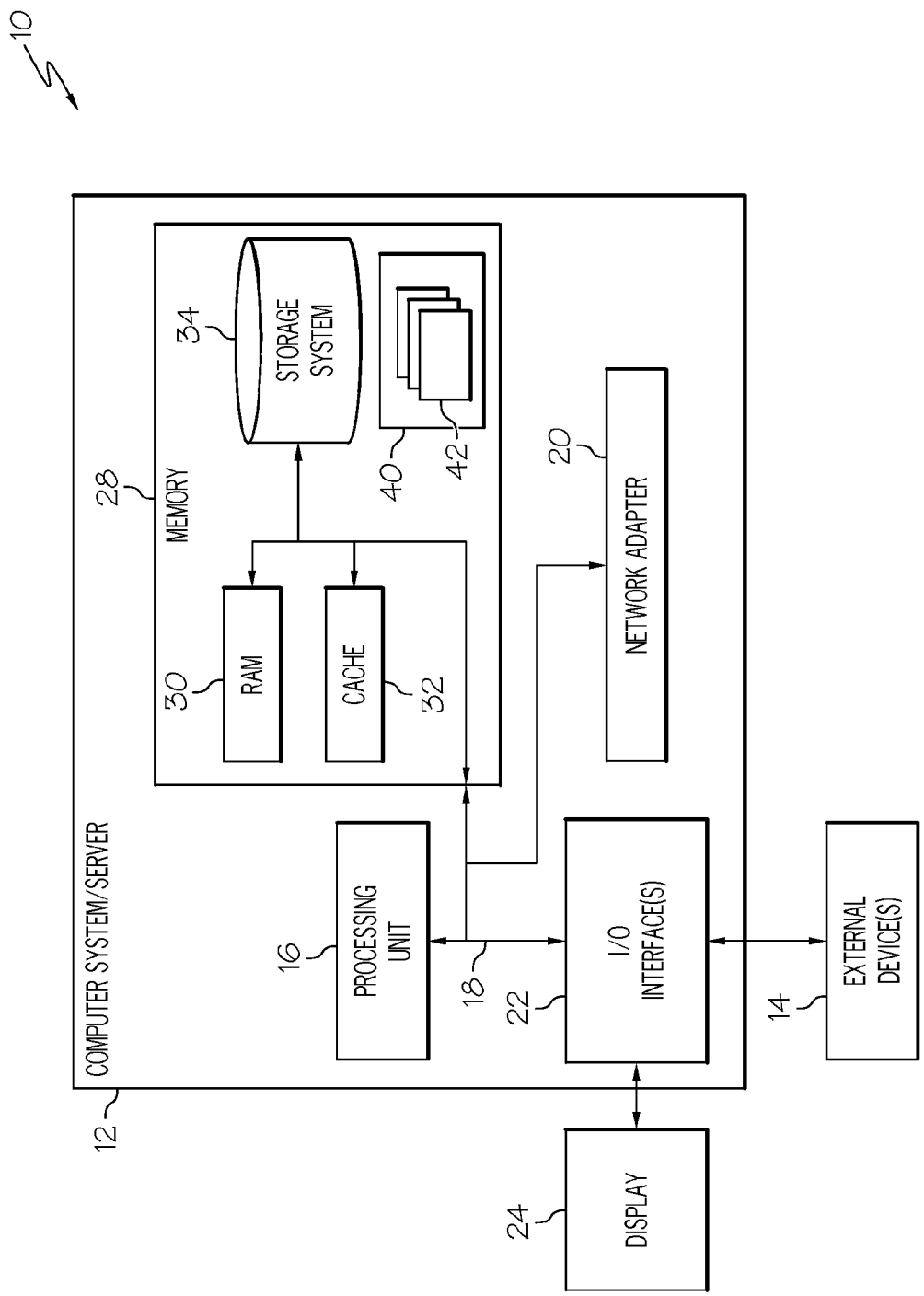
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for providing a multi-tenant/customer partition group separator and securer in a shared cloud infrastructure (e.g., as an extension to DB2®, Label-Based Access Control (LBAC), and/or an independent tool). Among other things, embodiments of the present invention provide cloud administrators with an easy to use customizable, configurable security constraint builder/tool with a built-in multi-tenant/customer enabled security model. Moreover, embodiments of the present invention enable cloud administrators to set up, configure, and manage tenants/customers and their private shards with their own security constraints. The output of this tool greatly eases the time to create an invisible (e.g., software) wall of separation for multiple tenants/customers in a shared cloud infrastructure.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant/customer model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
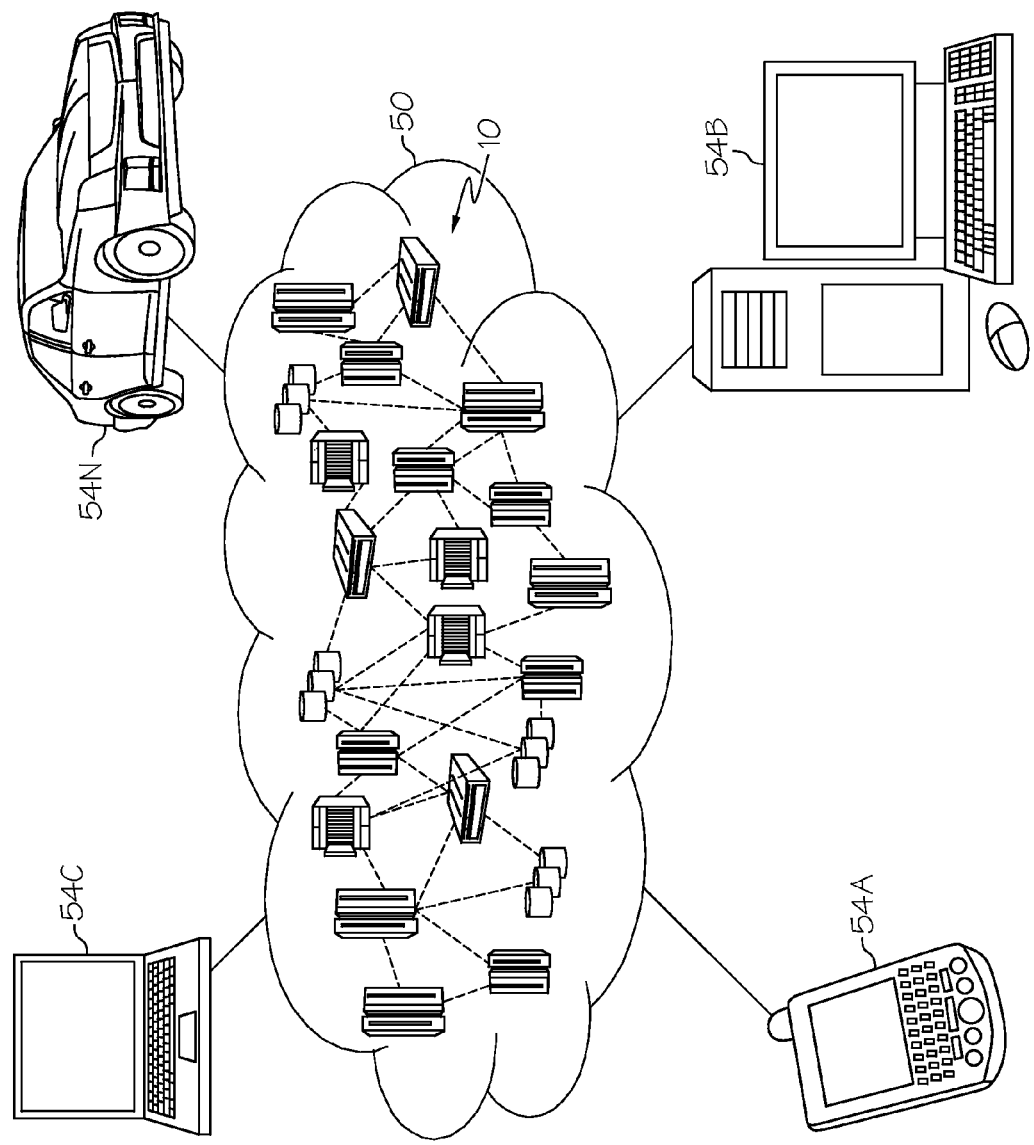
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
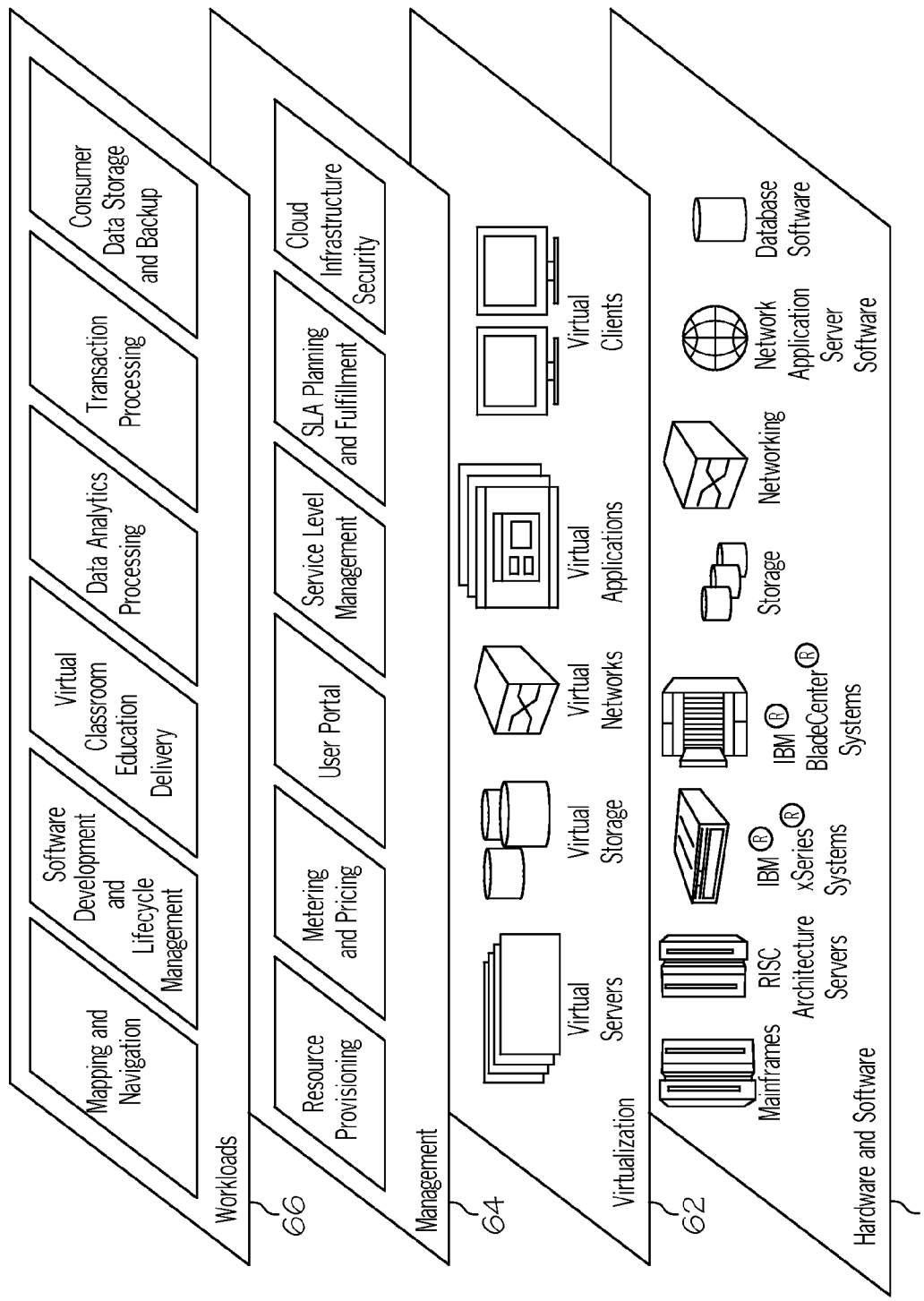
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is cloud infrastructure security, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the cloud infrastructure security functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
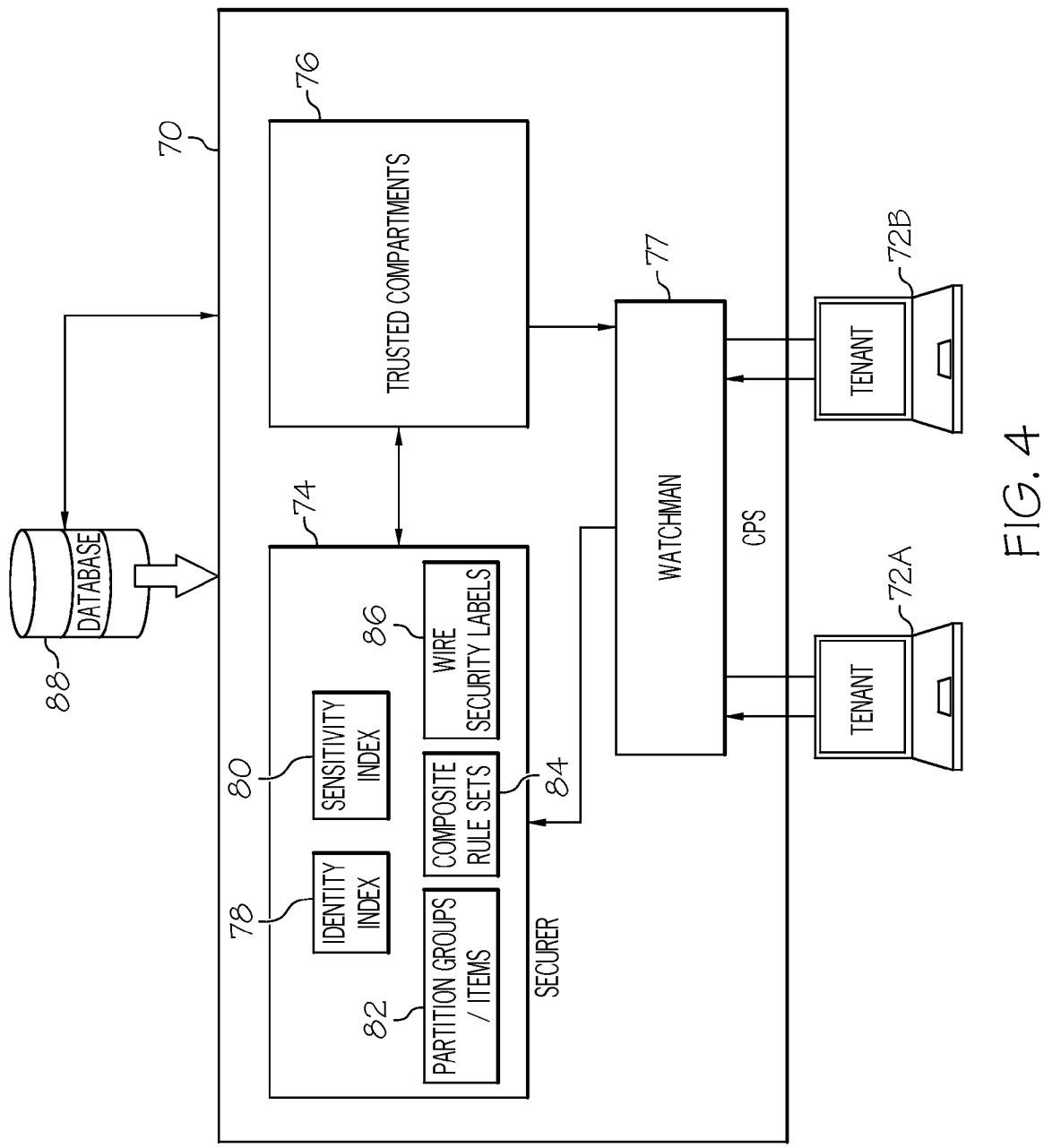
FIG. 4 depicts an architectural diagram of a cloud private shard securer (CPS) tool according to an embodiment of the present invention.

Referring now to FIG. 4, system diagram according to an aspect of the present invention is shown. As depicted, a cloud private shard securer (CPS) tool 70 is shown. In general, CPS tool 70 can be implemented as program 40 on computer system 12 of FIG. 1 and can implement the functions recited herein as depicted in management layer 64 of FIG. 3. In general, CPS tool 70 provides security for multiple tenants/customers and their associated database shards/partitions.

A database shard is typically a horizontal partition in a database or search engine. Each individual partition is referred to as a shard or database shard. Horizontal partitioning is a database design principle whereby rows of a database table are held separately, rather than splitting by columns (as for normalization). Each partition forms part of a shard, which may in turn be located on a separate database server or physical location.

There are multiple advantages to this partitioning approach. The total number of rows in each table is reduced. This reduces index size, which generally improves search performance. A database shard can be placed on separate hardware, and multiple shards can be placed on multiple machines. This enables a distribution of the database over a large number of machines, which means that the database performance can be spread out over multiple machines, greatly improving performance. In addition, if the database shard is based on some geographical segmentation of the data then it may be possible to infer the appropriate shard membership easily and automatically, and query only the relevant shard. Embodiments of the invention provide sharding/partitioning automatically, and for identifying candidates to be sharded/partitioned separately. Where distributed computing is used to separate load between multiple servers (either for performance or reliability reasons) a shard approach may also be useful.

Horizontal partitioning splits one or more tables by row, usually within a single instance of a schema and a database server. It may offer an advantage by reducing index size (and thus search effort) provided that there is some obvious, robust, implicit way to identify in which table a particular row will be found, without first needing to search the index (e.g., 'CustomersEast' and 'CustomersWest' tables, where their zip code already indicates where they will be found). Sharding/partitioning goes beyond this: it partitions the problematic table(s) in the same way, but it does this across potentially multiple instances of the schema. Splitting shards across multiple isolated instances requires more than simple horizontal partitioning. The hoped-for gains in efficiency would be lost if querying the database required both instances to be queried just to retrieve a simple dimension table. Beyond partitioning, sharding/partitioning thus splits large partitionable tables across the servers, while smaller tables are replicated into them en masse.

This is also why sharding/partitioning is related to a "shared nothing" architecture. Once sharded, each shard can live in a totally separate logical schema instance/physical database server/data center/continent. There is no ongoing need to retain shared access (from between shards) to the other un-partitioned tables in other shards. This makes replication across multiple servers easy (simple horizontal partitioning cannot). It is also useful for worldwide distribution of applications, where communication links between data centers would otherwise be a bottleneck.

Hereinbelow, the approach of the present invention is further described within the context of an illustrative multi-tenant/customer application that would yield to an invisible software wall (a pure multi-tenant/customer shared private shard with its specifics of security constraint). Multi tenancy is an important cloud paradigm to drive down infrastructure cost. As much as the benefits of multi tenancy are examined, the complexity in setting up, configuring, and customizing a multi-tenant/customer enabled private shard is very high. It is assumed that multi providers who would serve a composite group of multi-tenant/customers reside in the same cloud infrastructure.

CPS tool 70 provides the appropriate user interface to input the required constraint. The fundamental steps to set up, configure, and customize are detailed below. As depicted in FIG. 4, tool 70 generally comprises a securer 74 having an identity index 78, a sensitivity index/mapping 80, partition groups/items 82, composite rule sets 84, and wire security labels 86. Tool 70 further includes trusted compartments 76, and a security watchman 77. In general, these components allow for database shards/partitions to be established in a shared database/data structure 88 for each of a set (at least one) of tenants 72A-N.

Figure 5:
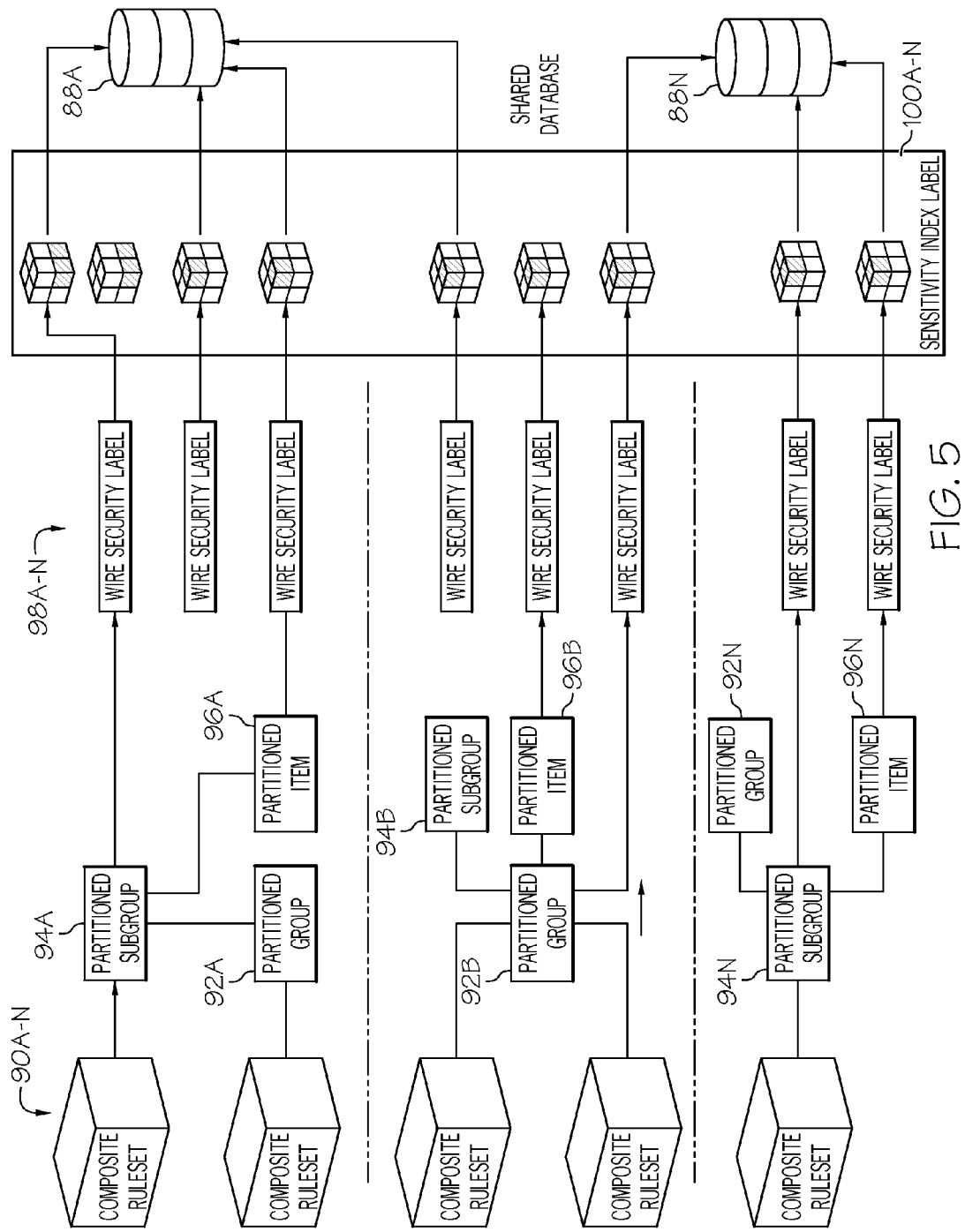
FIG. 5 depicts a first diagram of a multi-tenant/customer security model according to an embodiment of the present invention.

The functionality and interrelationship of the components of tool 70 will be described using FIGS. 4 and 5 collectively based on an illustrative example of a cloud infrastructure PaaS (Platform as a service) middle ware that supports hosting a loan multi-tenant/customer enabled application. Assume that the loan application is utilized by multiple tenant/customers 72A-N on the cloud infrastructure. Under such an example, tenant/customers 72A-N are equivalent to multiple private shards/partitions. The cloud PaaS middle ware interacts with the shared data source 88 to service tenant/customers 72A-N.

The "stakeholders" of this illustrative example, can be broadly divided into the following roles and associated functions:

| | |
|---|---|
| Cloud Provider | A Cloud provider of the infrastructure, who provides the multi-tenant/customer applications for consumption. |
| Cloud Tenant/customer Administrator | A Cloud tenant/customer administrator who provisioned the loan multi-tenant/customer application for consumption. |
| Cloud Tenant/customer User | Cloud tenant/customer users consuming application running in the stood up cloud PaaS. |

When a request comes to the cloud provider to provision any SaaS (Software as a Service) application, an automated system either programmatically or manually invokes the CPS tool 70 in the provisioning process and inserts the multi-tenant/customer model into the shared data source 88. Referring to FIG. 5, the partition/sharding process is shown in greater detail. As indicated above, each tenant/customer 72A-N provisioned is grouped into its own partitioned group 92A-N. Every partitioned group is attached to its partitioned subgroups 94A-N. A partitioned subgroup can encompass role-based behavior or activity/tasks-based behavior. A composite rule set 90A-N, is then attached to each of the groups 92A-N and/or 94A-N (e.g., based on global behavior and tenant/customer specific behavior). A set of provisioning scripts is then programmatically executed to initialize composite rules set 90A-N.

CPS tool 70 then presents a default set of behavior for a multi-tenant/customer environment. Once the setup is complete, the cloud tenant/customer administrator can adjust and make changes to build a multi-tenant/customer model. The multi-tenant/customer model that comes out as the end result is saved in the standalone environment or can be attached to a data source.

Once the tenant/customer is provisioned to consume the loan application, the tenant/customer specific configuration can be provided by the tenant/customer administrator for that particular tenant/customer. Moreover, the rule set can be changed/deleted/added. This is done using a dashboard interface which allows only the tenant/customer specific stuff to be seen.

The composite rule sets 90A-N define an identity index for the tenant/customer and/or or a cloud database administrator. Thereby, the above configurable rules set the identity index of the tenant/customer. The identity index should be pre-checked at the run time with the sensitivity of the data, and is used to be validated once the user enters or requests to enter the system.

The sensitivity of the data is marked by the user via sensitivity index labels 100A-N while storing the data to the shared databases 88A-N (irrespective of the rows and columns), which in turn is governed by a wired security label 98A-N. This process is further defined by the following steps:

1. The tenant/customer user enters the system via encrypted keys:
2. Keys are validated and checked with the composite rules set which in turn define the identity index of the user entering the system.
3. The data is stored to one or more shared data structures 88A-N according to a wired security label 98A-N marking each data set with a sensitivity index label 100A-N.
4. During retrieval of the data, the identity index is validated with sensitivity of the data. If yes, the data is retrieved from databases 88A-N. For all else, the data is not retrieved.

Figure 6:
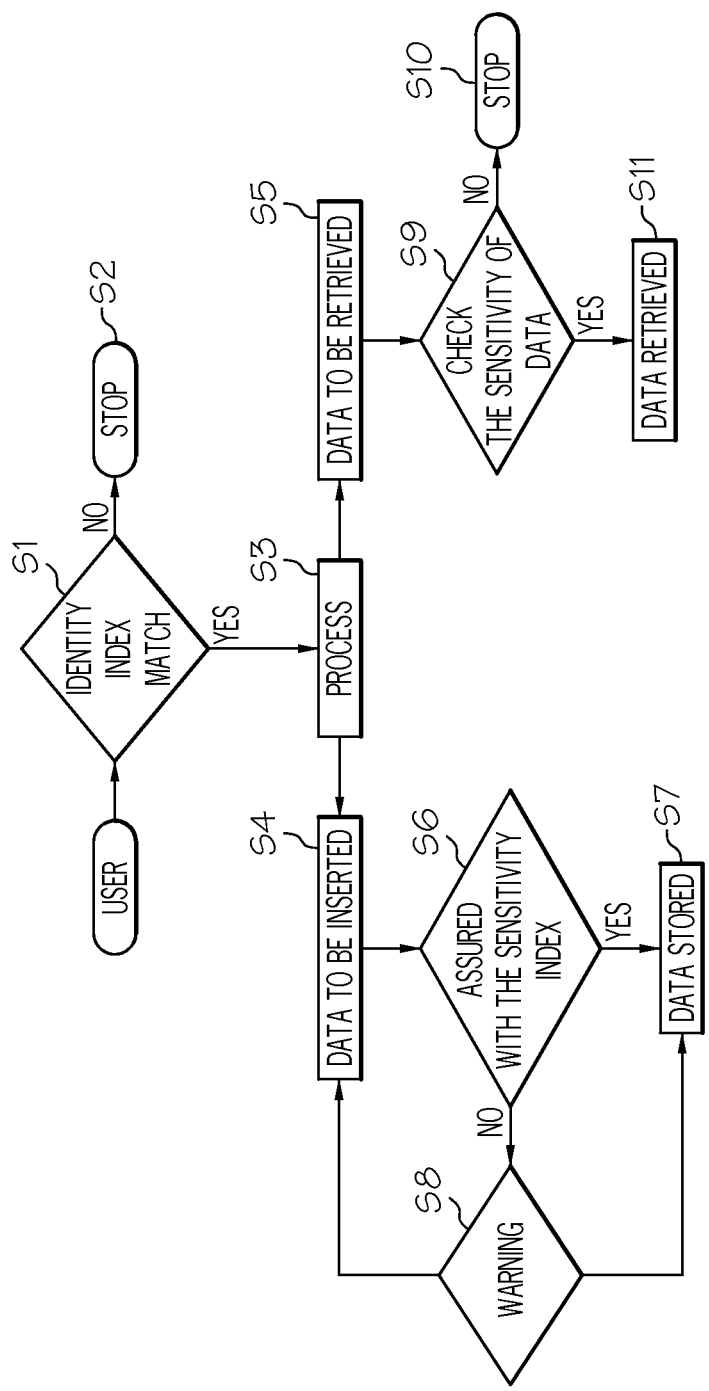
FIG. 6 depicts a method flow diagram according to an embodiment of the present invention.

Referring to FIG. 6, a method flow diagram showing the data storage/retrieval process according to an embodiment of the present invention is depicted. In step S1, a data request (e.g., to store and/or retrieve data stored in shared databases/storage devices 88A-N of FIG. 5) is received from a user, and it is determined whether the user identify is confirmed/matched according to stored user credentials. If not, the process is stopped in step S2. If the identity does match, the request is processed in step S3, and it is determined what type of data request it is (e.g., to store request or retrieval request). If the data request to store/insert data is determined in step S4, it is determined whether the integrity of the corresponding data can be assured with the sensitivity index in step S6. If so, the data is stored in step S7. If the integrity of the data cannot be assured, it is determined whether a warning should be issued in step S8. If so, the warning is issued, and the process returns to step S4. If not, the data can be stored in step S7. If the data request is determined in step S4 to be a retrieval request, the request data is determined in step S5. In step S9, the sensitivity of the data is checked against the sensitivity index. If the check does not match, the process is stopped in step S10. If the check does result in a "match", the data is retrieved in step S11.

Illustrative Use Case

In an illustrative example, assume that a tenant/customer administrator loaded data to the system, with the following sensitivity of the data: Name (identity index, sensitivity index); Empid (identity index, sensitivity index); and City (identity index, sensitivity index).

Now, further assume that the "user-1" has the correct identity index associated with him/her, and that the sensitivity index marked as 1° will only be able to retrieve the following data:

| Name | Emid | City |
|------|------|------|
| A(M, 1°) | 001(M, N, 1°) | — |
| A(M, 1°) | — | — |

Under this use case, another "user-2" can be given the same identity index but the sensitivity index associated with the user is 2° can be configured to only be able to retrieve the following data.

| Name | Emid | City |
|------|------|------|
| A(M, 1°) | 001(M, N, 1°) | — |
| A(M, 1°) | 002(M, N, 2°) | — |

The following section will explain more about the sensitivity indexing concepts. In general, all the data in a table will be marked with a key mapping. The sensitivity index is divided in the terms of degree (e.g., 0 degree, $1^{st}$ degree, $2^{nd}$ degree and $3^{rd}$ degree, etc.) in increasing order of restricted access. Therefore, if the data is X, then the data is stored as:

$$X(M_1, N_1, I^0)$$

Figure 7:
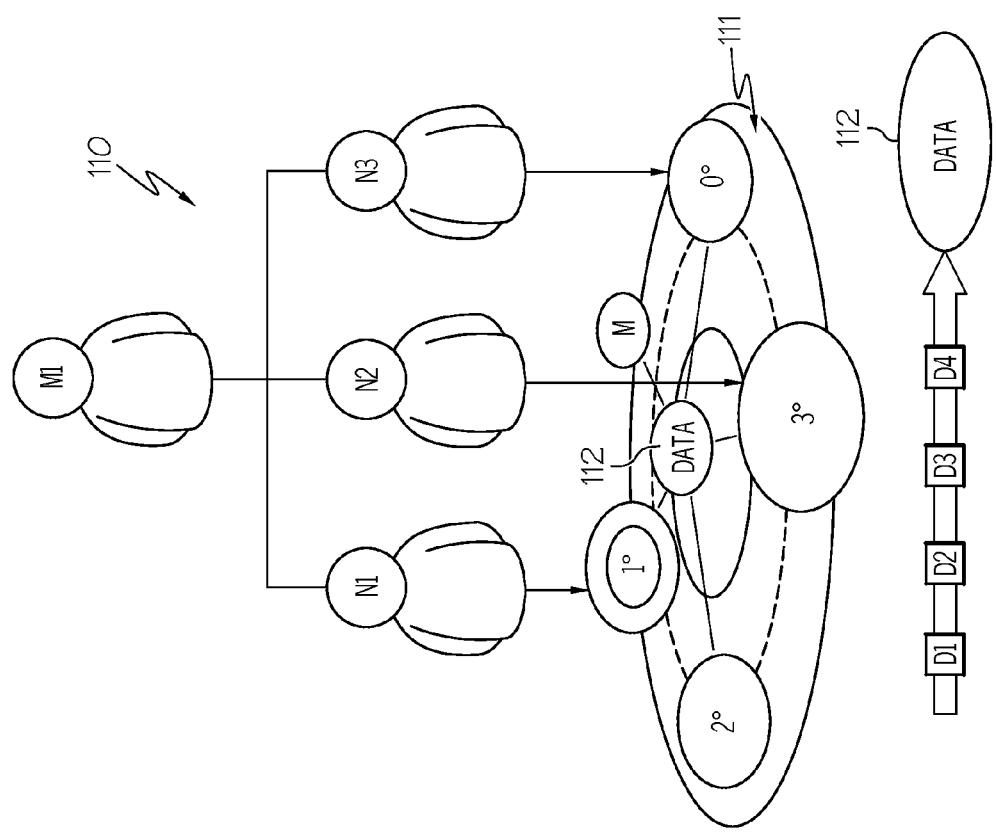
FIG. 7 depicts a data sensitivity index according to an embodiment of the present invention.

So, for example, if the data is of tenant/customer M1 and user N1 with sensitivity of 1, the degree then will be stored as:

$$X(M_1, N_1, I^0)$$

where I is the sensitivity index. The mapping of the sensitivity of the data in accordance with the user is stored in a hierarchical tree-like structure. FIG. 7 shows such a hierarchical tree 110 depicting the way that data 112 can be mapped in accordance with a new mapping for a tenant/customer M1 and its users N1-N3 along with the degree of their sensitivity 114 in respect to the tenant/customer's users N1-N3. The data 112 is then stored in the shared database/data structure using the associated sensitivity and identity indexes.

For example: Assume that there is a schema Table MT scenario that contains the three columns (Name, Empid, City). Further assume that this table is being shared by the three different tenant/customers, which have different needs for the importance of columns or the relations of the entity in the table. Such a table 120 is shown in FIG. 8. As depicted, table 120 has columns 122A-C that pertain to Name, Empid, and City, respectively. Where tenant/customer M1 has made column City as highly confidential, Empid and Name are unclassified. Those M1 users having the required sensitivity index attached thereto will be able to access the data. In the second row of the table, the user N2 of the tenant/customer M1 has modified the way he/she wants to store the data and assign the sensitivity of data.

Whereas tenant/customer M2 has made column Empid as highly confidential, City and Name are unclassified. Meanwhile, tenant/customer M3 can easily set Name and Empid as confidential, and City as highly confidential. These methods give flexibility to store the data as per the tenant/customer or tenant/customer users. The data will be retrieved by those who have the adequate sensitivity indexed with them.

Figure 9:
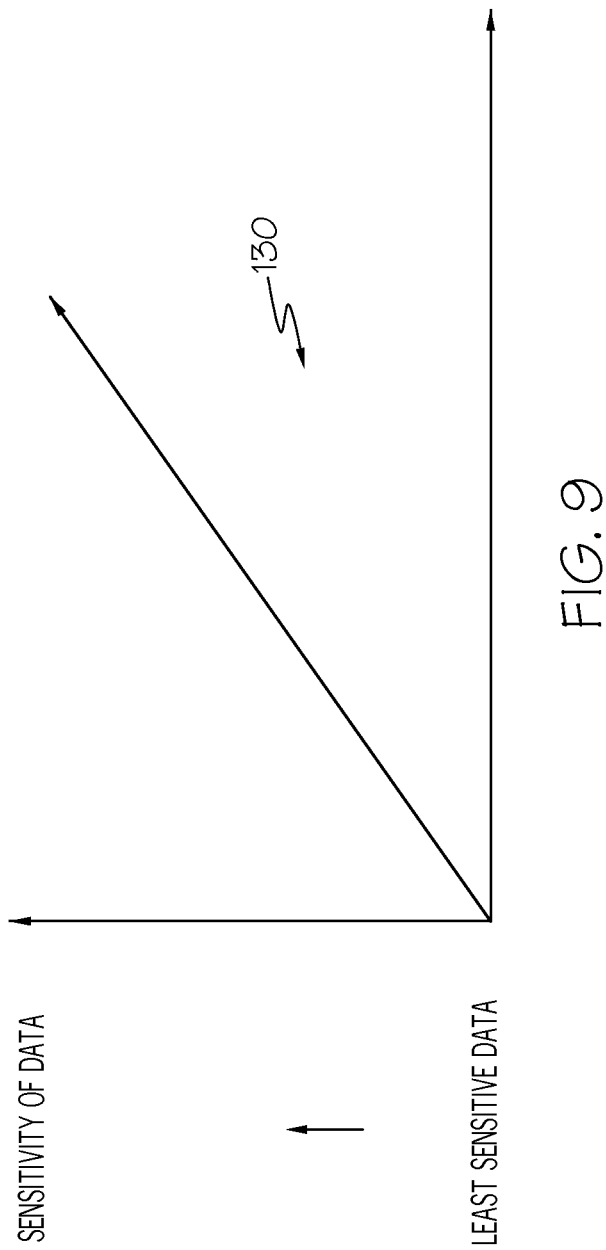
FIG. 9 depicts a graph showing a relationship between a sensitivity index and a user index according to an embodiment of the present invention.

Referring now to FIG. 9, the relation between the sensitivity index and identity access is depicted via graph 130. As depicted, these two are directly proportional to each other (e.g., linear). If sensitivity is high, then the identity of the user will have higher access/role. Conversely, if the identity of the user is high, the user will have more access to more sensitive data.

This concept is shown by the following algorithm:

$$I^{0\{9\ to\ 3\}} \rightarrow M_n N_n$$

Component Functionality

Securer: Securer 74 (FIG. 4) is part of the trusted compartments of CPS tool 70 (FIG. 1), which will use the sensitivity index and the matrix-based identity index. All the information of the sensitivity indexing and the matrix based identity will be stored in the securer 74 as a dictionary. The sensitivity of for a specific data will be:

$$A1(i,j,k)$$

Where i=j=k and its value is highest in the mapping dictionary, the data will be treated as highly confidential and so on. If the value is the lowest, the data will be treated as open to all the specific tenant/customer. The data with the in-between values will be accessible based on the users privileges.

Figure 10:
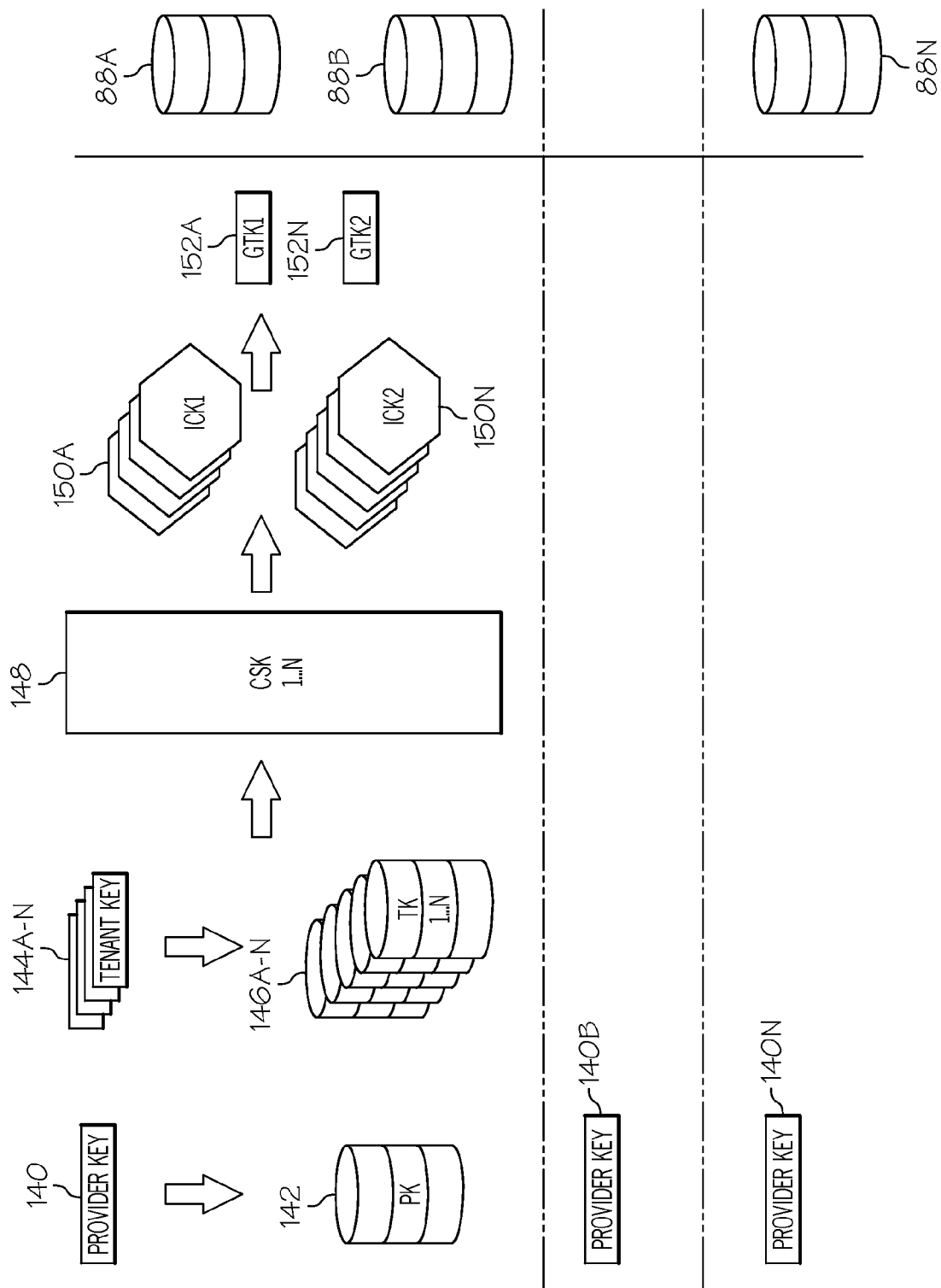
FIG. 10 depicts a diagram showing the creation of keys for an identify index according to an embodiment of the present invention.

Encryption (Identity index): There arises a need when a hacker gets into the system or sensitive data is stored in the shared cloud infrastructure. This calls for making the CPS tool 70 support sensitive data where only the tenant/customer (e.g., partitioned group with necessary partitioned subgroup access) can view and access the data if authorized. The encrypted data in each of the partitioned private shard are accessed and stored using a generated key during the setup step. The generation of a key for each composite rule set is shown in FIG. 10.

As depicted, when a new cloud provider is installed in the PaaS environment of the cloud infrastructure, a unique provider key 140A-N to identify the provider is generated and stored in a provider key database 142 or the like. This key is termed as PK[1 . . . n]. A unique tenant key 144A-N is also generated for each of the tenant/customers during provisioning, whereby the CPS tool 70 is either invoked automatically or manually as a step in the provisioning process. These keys are termed as TK[1 . . . n], and stored in one or more tenant key databases 146A-N.

Every Composite Rule Set is provided a key referred to as a Composite Set Key (CSK) CSK [1 . . . n]. The Default Composite Rule Set is created during provisioning which the view is to be extended by the specific partitioned group (tenant/customer).

The combination of PK[1 . . . n]+TK[1 . . . n]+CSK[1 . . . n] 148 produces Individual Composite Keys (ICKs) 150A-N (which can have associated Group Tenant Keys (GTKs 152A-N). The ICKs 150A-N provide a data masking approach, which can be configured in the appropriate rule set, if a need exists to do so or not. Under these teachings, different CSKs can have different keys attached. Conditions may arise where a data mask using a specific CSK cannot be accessed by the other; ideally the access should have been granted. For example, a "given tenant/customer administrator should access tenant/customer specific data when such need arises". To circumvent this scenario every CSK is associated with a numeric priority. The numeric priority is computed based on the set of rules in the rule set CSK. If the numeric priority of any CSK is higher than the one it compares against, it is by default and the new CSK will have access to that data. For example, an administrator with a CSKp value of 5.0 can view data of CSKp of 5 or less.

When a user authenticates to the CPS tool 70, the credentials are verified. During verification. the CPS brings back the necessary key, which results in a user getting associated to a tenant/customer group (partitioned group) and other behavior.

Stood Up—Service: This key ICK also provides a Uniform Resource Locator (URL) to access the CPS tool-enabled service programmatically from an application if need be.

Setup—Compartmentalization: The compartmentalization function not only provides the avoidance of comparisons during runtime execution of database queries but also the separations of the log files to be written, thereby writing the logs separately as per the tenant/customers. Once the user is logged into a cloud MT environment, direct access to the databases and their objects will not be provided to the user. The user in turn will be provided with a temporary secured compartment (logical) to work on its data.

As of now, the buffer pool manager of the database will provide data to the user based on user query. But with the concept of compartments, the scenario will change. Once the user is logged in, the temporary compartment will be created, and only that data for which the user-ID is authorized (taking in consideration the identity and sensitivity index the compartment will utilize). And in that compartment, he can do all the activities. Once logged in, the compartment will move to Recently Used compartment (RUC) for a period of time (e.g., a few hours). This can be used if a network connection between the application servers and the processor fails. RUC is for reducing the resource consumptions and will be destroyed after one day depending upon the cloud environment (public or private cloud).

Figure 11:
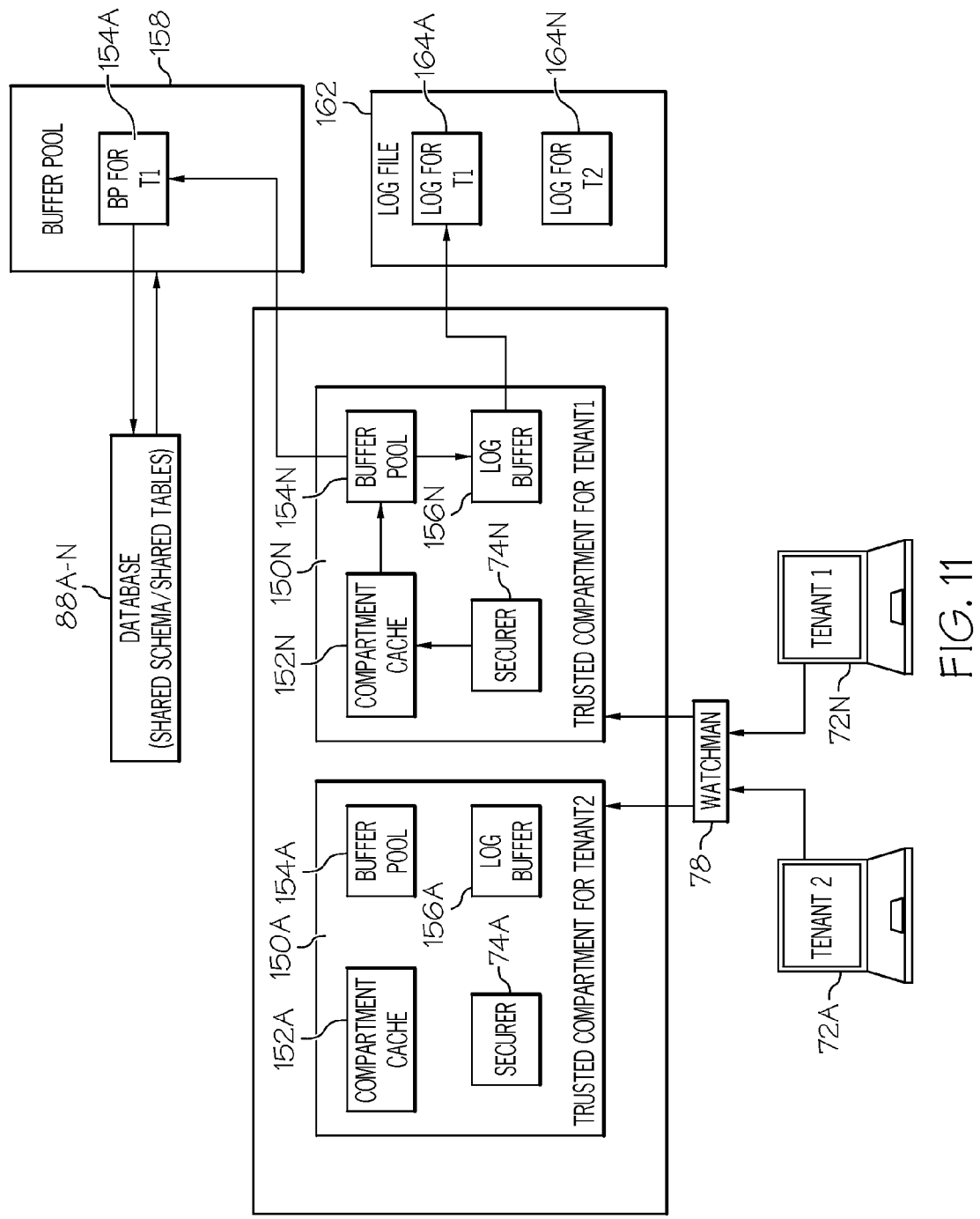
FIG. 11 depicts a diagram showing compartmentalization according to an embodiment of the present invention.

These compartments are different from the Session ID that is created for the users in MT databases. The following basic work flow/steps are used by CPS tool 70 (FIG. 4). These steps will be discussed in conjunction with FIG. 11.

Step 1: Tenant(s)/customer(s) 72A-N connect to the system using the cryptographic operations keys. These keys denote the trusted keys (PK and CK) and session keys.

Step 2: Once the key(s) are authenticated by the watchman 77, the watchman 77 in turn issues a request to create a trusted compartment 150A-N for each tenant/customer 72A-N. If the key is not authenticated, the connection is refused.

Step 3: Once the trusted compartment 150A-N are created (e.g., logically), a data request from any tenant/customer 72A-N will be routed to the request to the corresponding securer 74A-N where the authorizations will be validated. The securer validation for the authorization depends on the sensitivity indexing.

Step 4: A compartment cache 152A-N will contain all the queries running and the data requests for the databases 88A-N will be processing using a set of buffer pool frames 154A-N. The buffer pool frames 152A-N are not the whole buffer pool 158, but the few specific address spaces allocated for the individual tenant/customer 72A-N.

Step 5: The buffer pool frames 154A-N, which in turn will write a set of log buffer frames 156A-N (log buffers frames 156A-N will be encrypted by the keys discussed above). In addition, the archives of the log files 164A-N will be encrypted and stored to the system fully encrypted for each tenant/customer separately.

Step 6: Once the data is written to the log files 164A-N of log file 162, the buffer pool 158 will externalize the data by writing the data to the database(s) 88A-N in the individual tenant/customer's partitions/shards.

Figure 12:
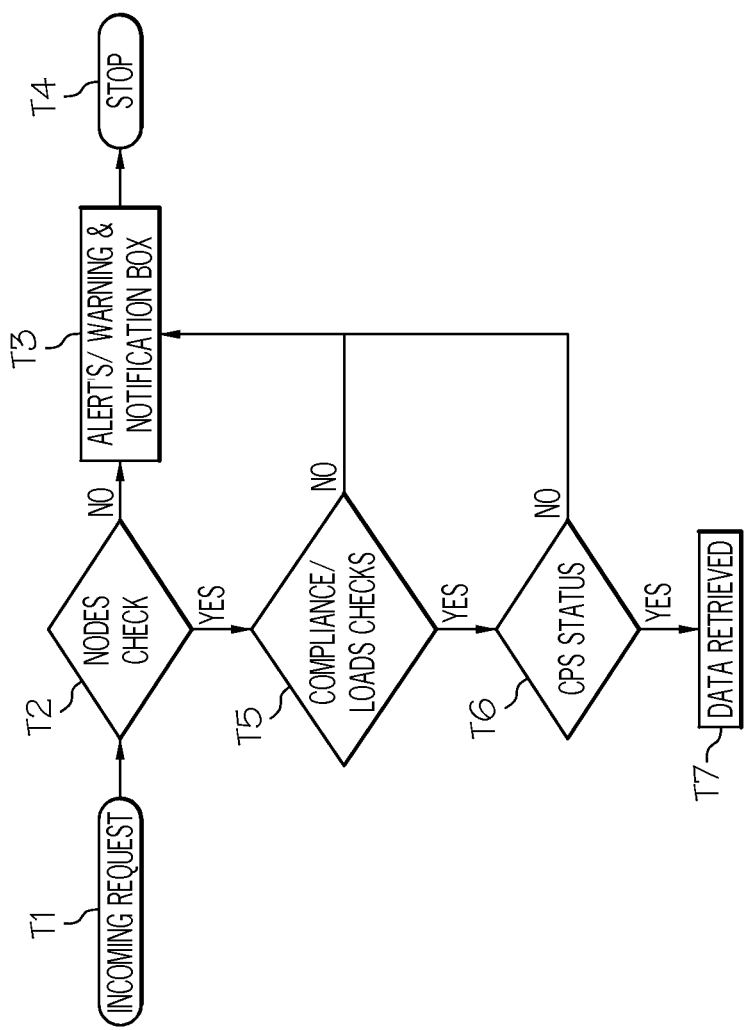
FIG. 12 depicts a method flow diagram of watchman functionality according to an embodiment of the present invention.

Watchman: The watchman 78 provides a process as a part of CPS tool 70 (FIG. 4), which in turn will handle/facilitate various functions. Such functions are depicted in the context of the flow diagram of FIG. 12. As shown in step T1, a request is received. In step T2, watchman 70 will check all incoming queries to verify the queries originate from the correct node. If the check reveals a discrepancy, alerts/warning and/or notifications can be generated in step T3, and the process is stopped in step T4. In step T5,) watchman 70 will assist in managing workloads from a specific tenants/customers/users verify compliance with applicable rules/regulations (e.g., SLAs, HIPAA, etc.). If loads are unbalanced and/or compliance is not maintained, the process returns to steps T3 and T4. If, however, the load is balanced and compliance is maintained, watchman 70 will verify a status of CPS tool 70 in step T6. If the status of CPS tool 70 is "active", the requested data can be retrieved in step T7 and routed to the requesting node. If, however, the status of CPS tool 70 is "inactive", the process returns to steps T3 and T4.

While shown and described herein as a cloud infrastructure security solution, it is understood that the invention further provides various alternative embodiments. For example, in one embodiment, the invention provides a computer-readable/useable medium that includes computer program code to enable a computer infrastructure to provide cloud infrastructure security functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide cloud infrastructure security functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for cloud infrastructure security. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for building data security in a networked computing environment, comprising:
    partitioning a shared data source of the networked computing environment into a set of private partitions pertaining to a set of customers;
    associating a set of composite rule sets with the set of private partitions, the composite rule sets defining an identity index of the set of customers to which the private partitions pertain;
    receiving a connection request for the shared data source from a customer of the set of customers, the connection request having a cryptographic key associated with the customer;
    creating a trusted compartment for the customer responsive to an authentication of the cryptographic key;
    receiving a data request from the customer;
    determining at least one of the set of private petitions in which the requested data is to be stored or retrieved based on the data request;
    validating the data request by determining whether an identity index of the customer is of a degree sufficient to process the data request based upon a sensitivity index of data requested by the data request and the identity index from the composite rule set associated with the determined private partition;
    processing the data request using a buffer pool frame and the determined at least one of the set of private partitions; and
    creating an entry in a log corresponding to the customer pursuant to the processing of the data request.

2. The computer-implemented method of claim 1, the networked computing environment comprising a cloud computing environment.

3. The computer-implemented method of claim 1, further comprising configuring the sensitivity index for the customer.

4. The computer-implemented method of claim 1, the validating comprising:
    routing the data request to a securer; and
    validating the data request using the securer.

5. The computer-implemented method of claim 1, further comprising storing the data request in a compartment cache associated with the trusted compartment.

6. The computer-implemented method of claim 1, the logging comprising:
    writing a log buffer frame pursuant to the processing; and
    encrypting the log buffer frame using the cryptographic key.

7. The computer-implemented method of claim 1, further comprising writing data associated with the data request to the partition.

8. A system for building data security in a networked computing environment, comprising:
    a memory medium comprising instructions;
    a bus coupled to the memory medium; and a processor coupled to the bus that when executing the instructions causes the system to:

partition a shared data source of the networked computing environment into a set of private partitions pertaining to a set of customers;

associating a set of composite rule sets with the set of private partitions, the composite rule sets defining an identity index of the set of customers to which the private partitions pertain;

receive a connection request for the shared data source from a customer of the set of customers, the connection request having a cryptographic key associated with the customer;

create a trusted compartment for the customer responsive to an authentication of the cryptographic key;

receive a data request from the customer;

determine at least one of the set of private petitions in which the requested data is to be stored or retrieved based on the data request;

validate the data request by determining whether an identity index of the customer is of a degree sufficient to process the data request based upon a sensitivity index of data requested by the data request and the identity index from the composite rule set associated with the determined at least one of the set of private partitions;

process the data request using a buffer pool frame and the determined at least one of the set of private partitions; and create an entry in a log corresponding to the customer pursuant to the processing of the data request.

9. The system of claim 8, the networked computing environment comprising a cloud computing environment.

10. The system of claim 8, the memory medium further comprising instructions for causing the system to configure the sensitivity index for the customer.

11. The system of claim 8, the memory medium further comprising instructions for causing the system to:
route the data request to a securer; and
validate the data request using the securer.

12. The system of claim 8, the memory medium further comprising instructions for causing the system to store the data request in a compartment cache associated with the trusted compartment.

13. The system of claim 8, the memory medium further comprising instructions for causing the system to:
write a log buffer frame pursuant to the processing; and
encrypt the log buffer frame using the cryptographic key.

14. The system of claim 8, the memory medium further comprising instructions for causing the system to write data associated with the data request to the partition.

15. A computer program product for building data security in a networked computing environment, the computer program product comprising a nontransitory computer readable storage media, and program instructions stored on the nontransitory computer readable storage media, which when executed by a computing device cause the computing device to:

partition a shared data source of the networked computing environment into a set of private partitions pertaining to a set of customers;

associate a set of composite rule sets with the set of private partitions, the composite rule sets defining an identity index of the set of customers to which the private partitions pertain;

receive a connection request for the shared data source from a customer of the set of customers, the connection request having a cryptographic key associated with the customer;

create a trusted compartment for the customer responsive to an authentication of the cryptographic key;

receive a data request from the customer;

determine at least one of the set of private petitions in which the requested data is to be stored or retrieved based on the data request;

validate the data request by determining whether an identity index of the customer is of a degree sufficient to process the data request based upon a sensitivity index of data requested by the data request and the identity index from the composite rule set associated with the determined at least one of the set of private partitions;

process the data request using a buffer pool frame and the determined at least one of the set of private partitions, the at least one of the set of private partitions corresponding to the customer; and create an entry in a log corresponding to the customer pursuant to the processing of the data request.

16. The computer program product of claim 15, the networked computing environment comprising a cloud computing environment.

17. The computer program product of claim 15, the nontransitory computer readable storage media further comprising instructions to configure the sensitivity index for the customer.

18. The computer program product of claim 15, the nontransitory computer readable storage media further comprising instructions to:
route the data request to a securer; and
validate the data request using the securer.

19. The computer program product of claim 15, the nontransitory computer readable storage media further comprising instructions to store the data request in a compartment cache associated with the trusted compartment.

20. The computer program product of claim 15, the nontransitory computer readable storage media further comprising instructions to:
write a log buffer frame pursuant to the processing; and
encrypt the log buffer frame using the cryptographic key.

21. The computer program product of claim 15, the nontransitory computer readable storage media further comprising instructions to write data associated with the data request to the partition.

22. A method for deploying a system for building data security in a networked computing environment:
providing a computer infrastructure being operable to:

partition a shared data source of the networked computing environment into a set of private partitions pertaining to a set of customers;

associate a set of composite rule sets with the set of private partitions, the composite rule sets defining an identity index of the set of customers to which the private partitions pertain;

receive a connection request for the shared data source from a customer of the set of customers, the connection request having a cryptographic key associated with the customer;

create a trusted compartment for the customer responsive to an authentication of the cryptographic key;

receive a data request from the customer;

determine at least one of the set of private petitions in which the requested data is to be stored or retrieved based on the data request;

validate the data request whether an identity index of the customer is of a degree sufficient to process the data request based upon a sensitivity index of data requested by the data request and the identity index from the composite rule set associated with the determined at least one of the set of private partitions;

process the data request using a buffer pool frame and the determined at least one of the set of private partitions; and create an entry in a log corresponding to the customer pursuant to the processing of the data request.

* * * * *